United States Patent [19]

Zheng

[11] Patent Number: 4,932,504
[45] Date of Patent: Jun. 12, 1990

[54] HYDRAULIC PUMPS OR MOTORS AND HYDROSTATIC TRANSMITTING SYSTEMS

[76] Inventor: Yue Zheng, Room 105, Building 15, (Old) Beicun, Nankai University, Tianjin, China

[21] Appl. No.: 386,295

[22] Filed: Jul. 27, 1989

Related U.S. Application Data

[62] Division of Ser. No. 100,103, Sep. 23, 1987, Pat. No. 4,872,536.

[30] Foreign Application Priority Data

Sep. 24, 1986 [CN] China ................... 86106471

[51] Int. Cl.$^5$ ............... F16D 57/00; F04C 2/18; F04C 15/04
[52] U.S. Cl. .............. 188/290; 418/21
[58] Field of Search .............. 188/290–296; 418/21, 19, 16, 13, 134, 125, 116, 117, 228, 225

[56] References Cited

U.S. PATENT DOCUMENTS

| | | | |
|---|---|---|---|
| 3,593,828 | 7/1971 | Klein et al. | 188/290 |
| 3,805,928 | 4/1974 | Caradot | 188/290 |
| 4,497,393 | 2/1985 | Brems | 188/290 |
| 4,740,142 | 4/1988 | Rohs et al. | 418/21 |

*Primary Examiner*—Douglas C. Butler
*Attorney, Agent, or Firm*—Darby & Darby

[57] ABSTRACT

An axial variable capacity rotary pump which yields a stepless change of capacity. The pump has a casing with an inlet and outlet, at least one rotary member with engaging elements mounted on the periphery of the rotary member for engaging a mating member, and a pair of axial sealing element which seal either axial side of the rotary member. One sealing element moves together with the rotary member axially to change a length of a sealed working chamber between the members, thereby changing the delivery capacity per revolution of the pump.

13 Claims, 4 Drawing Sheets

HYDRAULIC PUMPS OR MOTORS AND HYDROSTATIC TRANSMITTING SYSTEMS

This application is a division of application Ser. No. 100,103 filed Sept. 23, 1987, now U.S. Pat No. 4,872,536 issued Oct. 10, 1989.

FIELD OF THE INVENTION

The present invention relates to the field of hydraulic transmitting techniques, in particular to hydraulic pumps or motors and hydrostatic transmitting systems.

BACKGROUND OF THE INVENTION

The current variable capacity pumps (or motors, which are to be referred to similarly hereinafter) only have two types, namely the reciprocal plunger type and single action rotary vane type of variable capacity pumps. The plunger type variable capacity pumps are extremely sensitive to dust in oil and cost very much. The performance parameters of single action vane type variable capacity pumps are very poor. Furthermore, the pump or motor effect resulting from current hydraulic pumps or motors themselves is not changeable. In order to realize some specific functions in practical applications, some additional hydraulic elements are therefore needed for regulation purposes, thus leading to a huge system with complicated components and high costs consequently, the application field of hydrostatic transmitting systems is limited. For instance, hydro-mechanical transmitting systems are still used in current vehicles, although they have three disadvantages: first, the transmitting efficiency is low; secondly, the structure is complicated and the cost is high: thirdly, power cannot be transmitted inversely. The fundamental cause leading to these disadvantages lies in the vortex type hydraulic torque converter (composed of an impeller, a guide torus and a turbine) used in the system. This torque converter operates with high efficiency only in a very narrow range of speed ratio, beyond which the transmitting efficiency will decrease rapidly. The torque converter cannot transmit power inversely.

SUMMARY OF THE INVENTION

An object of the present invention is to provide an axial variable capacity pump or motor, especially an axial variable capacity gear pump or motor and an axial variable capacity double action vane pump or motor with simple structure, low cost, good adaptability and wide variable range. Another object of the present invention is to provide a simple structured effect-changeable pump or motor in which the pump or motor effect can be changed.

Still another object of the present invention is to provide a basic hydrostatic transmitting system which employs the hydraulic pump or motor of the present invention.

Yet another object of the present invention is to provide a hydrostatic transmitting system which employs the hydraulic pump or motor of the present invention and is especially suitable for vehicles.

It will be understood that so long as the working length L of the working chamber along the rotating axis in a rotary hydraulic pump or motor (termed pump hereinafter for short) is changed, the capacity of the hydraulic pump will proportionally vary. In the axial variable capacity pump of the present invention there is a sliding means which can rotate together with the rotary part of the pump and is slidably axially with respect to the rotary part. When it slides towards one side to shorten the working chamber length, the working volume wil be reduced. Sliding towards another side will increase the working volume. The axial movement of the sliding means will therefore change the delivery capacity of pump. The sliding means is termed as "capacity change member" in the present invention. When this capacity change member is employed to change the working length L by its axial movement, that is, to change the delivery capacity of the rotary hydraulic pump, an "axial variable capacity pump" is thus formed. When this pump is used to drive a fixed capacity motor (or a fixed capacity pump is used to drive an axial variable capacity motor), a basic hydrostatic transmitting system (or termed as "axial variable capacity torque converter") of the present invention is then formed.

On the other hand, in order to extend the function of hydraulic pumps or motors, the present invention also provides a function or effect-changeable pump or motor. It is understood that any kind of rotary hydraulic pump possesses a rotating component and a sealing component contacting the former. When these two components closely contact each other, a pump effect will be produced; when they are separated from each other, the pump effect will vanish. The sealing component in the present invention is movable relative to the rotating component. When it moves forward, it will contact the rotating component. When it moves backwards, it will separate itself from the rotating component, thereby to control the producing, vanishing strengthening and weakening of the pump effect. In the present invention, this movable sealing component is termed an "effect change member", and the pump or motor which has the effect change member is termed "effect-changeable pump" or "effect-changeable motor". The basic hydrostatic transmitting system of the present invention which includes the effect-changeable pump or motor and the axial variable capacity pump or motor has much better performance than ordinary hydrostatic transmitting systems.

DESCRIPTION OF THE DRAWINGS

FIG. 1 (a) is a longitudinal section view showing an axial variable capacity external gear pump of the present invention;

FIG. 1 (b) is a cross-sectional view along line A—A in FIG. 1 (a);

FIG. 1 (c) is a cross-sectional view along line B—B in FIG. 1 (a);

FIG. 1 (d) is a partly enlarged view of location I in FIG. 1 (a);

FIG. 1 (e) is a partly enlarged view of location II in FIG. 1 (b);

FIG. 2 (a) is a longitudinal sectional view showing an axial variable capacity internal gear pump of the present invention;

FIG. 2 (c) is a sketch showing the cross-section within the interval F in FIG. 2 (a);

FIG. 3 (a) is a sectional view showing an axial variable capacity double action vane pump of the present invention;

FIG. 3 (b) is a sketch showning the cross-section within the interval L in FIG. 3 (a);

DESCRIPTION OF THE PREFERRED EMBODIMENTS

Referring to FIG. 1, one embodiment is shown and the operating principle of axial variable capacity gear pumps is explained below.

With reference to FIG. 1(a)–1(e), the gear pump of this invention comprises two gears (3, 11) meshing with each other, in which gear 11 is moveable axially with respect to axially fixed gear 3. Also, there are two axial sealing means in which the right one is movable axially together with gear 11 relative to the left axially fixed one. In addition, there are two radial sealing means in which the lower one is movable axially along with the right axial sealing means and gear 11.

The left axially fixed axial sealing means consists of a fixed end plate 8 which rotatably supports the left end of the shaft of gear 3 and engages with the left end face of gear 3 in a fluid tight manner. A ring gear 10 is rotatably supported in the fixed end plate 8 and through which the gear 11 is rotatably supported at the left side and can move axially. An elastic ring gear-shaped gasket 24 is arranged between the ring gear 10 and the gear 11 for providing a seal therebetween. The right axially movable axial sealing means consists of a sliding end plate 5 which rotatably supports the right end of the shaft of gear 11 and engages with the right end face of gear 11 in a fluid tight manner. A ring gear 4 is rotatably supported in the sliding end plate 5 and sleeved on gear 3. An elastic ring gear-shaped gasket, which is the same as gasket 24, is arranged between ring gear 4 and gear 3 for providing a seal therebetween. The upper and lower radial sealing means respectively consists of a radial seal block 12, 7. An elastic gasket 13, 6 is arranged at the back of the seal block so that the seal blocks may make slight movement radially for compensating for the wear of the gears.

Figure 1A:
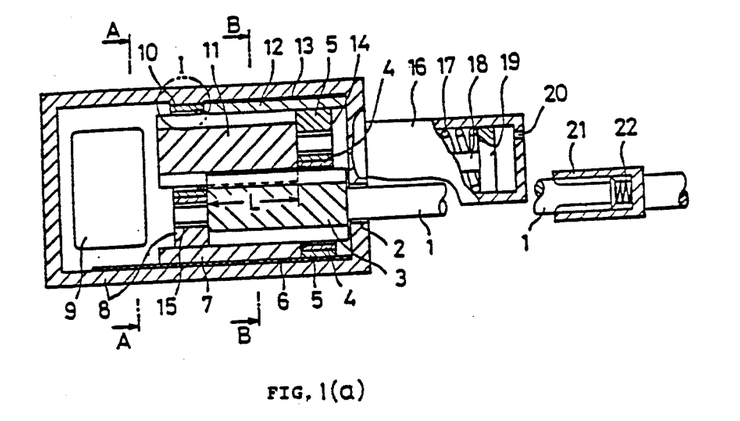

When the controlling rod pushes the sliding end plate 5 carrying ring gear 3 and the elastic ring gear-shaped gasket (that is the same as gasket 24) and the gear 11 engages with the sliding end plate 5 leftward, the meshing length L of two gears (3, 11), that is the length of the sealed chamber, will be shortened gradually. As a result, the capacitor of the pump will be decreased. When the converse is true, the length L and the capacity of the pump will be increased.

Input shaft 1 rotates together with driving gear 3 which drives the mating gear 11, the rotating direction being shown in FIG. 1 (c). Under the sealing action of radial seal blocks 7 and 12, fixed end plate 8 (assembled together with the casing), sliding end plate 5 and capacity change members 10 and 4, the oil is pumped from low pressure area 1 to high pressure area h, by flowing into the casing through a wide inlet opening 9 and flowing out of the casing through a wide outlet opening 23. The capacity change member 10 is an internal ring gear sleeved onto gear 11 and rotatable with gear 11. In the radial clearance between gear 11 and the ring gear is inserted a ring gear-shaped elastic gasket 24, which functions as the radial seal in the tooth clearance (see also enlarged views FIG. .1(d) FIG. 1(e)). The capacity change member is rigidly contacted with the gear along most of its axial length in order to provide a good positioning and supporting. It may be seen from enlarged view FIG. 1 (d) that capacity change member 10 has a flange which is used to withstand oil pressure and functions as a seal. Capacity change member 4 has the same structure, which is sleeved onto gear 3 and rotatable in sliding end plate 5. In FIG. 1 (a), reference numbers 2, 14 and 15 indicate needle bearings. Sliding end plate 5 may axially slide together with gear 11 and radial seal block 7. This forms the axial sealing on the right side together with capacity change member 4, radial seal blocks 7 and 12 and gaskets 6 and 13. When sliding end plate 5 is pushed leftward, gear 11 and capacity change member 4 are also pushed leftward and the capacity change member 10 moves rightward relative to gear 11, thus shortening the meshing length of mating gears, namely the working length L of the pump. The delivery capacity per revolution of the pump is then linearly reduced, while the efficiency unchanged. If the sliding end plate moves to the leftmost position to contact the fixed end plate, then L=O, the delivery capacity of the pump will be zero, the pump in the system is now equivalent to a closed valve and the input shaft will run idle. On the contrary, when sliding end plate 5 moves to the rightmost position, the working length L will reach its maximum value, and so does the delivery capacity per revolution. Hence, the axial motion of sliding end plate 5 makes the delivery capacity of the pump steplessly vary from zero to a maximum value. Every position of the sliding end plate corresponds to a gear pump with gear width L, maintaining the efficiency basically unchanged.

Radial seal blocks 7 and 12 have slots alternating with flanges on their outer surface. These blocks fit with the slots and flanges on the inner circumference of the casing in order to prevent the radial seal blocks from sliding towards a low pressure area under the load of oil pressure in a high pressure area. Some slots connecting the high pressure area are formed also on the outer surface of radial seal blocks in order to introduce some pressurized oil into these slots. This balances the radial pressure of the high pressurized oil in the tooth clearance, thus making the sliding end plate easier to move. Under the action of the pressurized oil and the elasticity of gaskets 6 and 13, the radial clearance between radial seal blocks and gears is compensated. The aforementioned slots and flanges are not shown in FIG. 1. The clearances between radial seal blocks and fixed or sliding end plate are also sealed by gaskets.

Figure 1B:
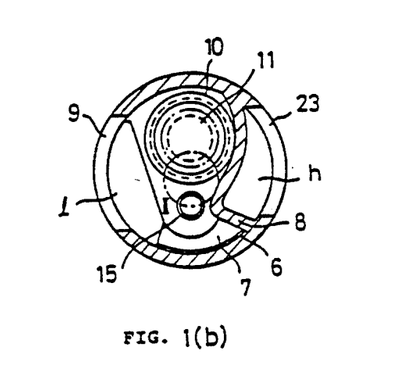
Figure 1C:
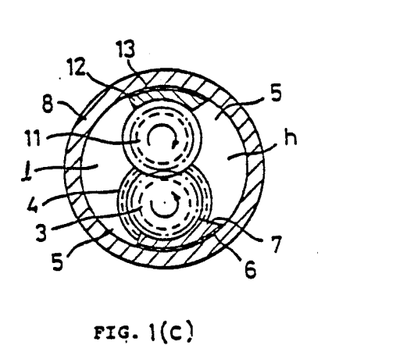
Figure 1D:
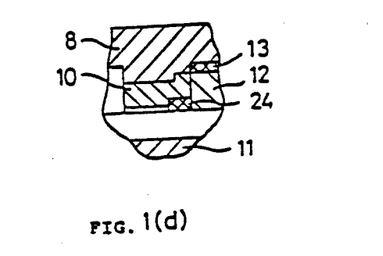
Figure 1E:
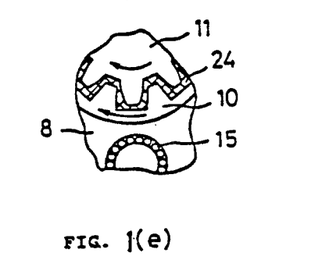

Referring to FIG. 1(b), partition plate 8 integrated with the casing is provided to separate the higher and lower pressure area. The compensation of axial clearance between gears and end plates can easily be realized using well known techniques. It is worth mentioning that when the pump in FIG. 1 (a) is used as a torque convertor for vehicles, its input shaft should be connected with transmitting shaft 21. Making use of the splined sleeve which can move forward and backward along the transmitting shaft and inserting a small spring 22, the axial clearance of gear 3 may be compensated.

In cylinder 16 connected to casing 8 is installed a piston 19, to which control rod 18 is connected. The other end of the control rod is fixed onto the pressure center of the sliding end plate. A hole 20 is drilled on cylinder 16 in order to lead high pressurized oil into the cylinder to form pressure on piston 19. The area of the piston is so designed as to use most of the pressure to balance the high pressure acting on the left side of sliding end plate, and use a small part of the pressure to compress spring 17. Imagining that the pump drives the hydraulic motor and then drives a load, if the loading torque increases by K times, the pressure acting on piston 19 and the force P of piston 19 acting on spring 17 also increases by K times. As long as the product of P and spring length X remains constant, force P will push sliding end plate leftward to shorten working length L to 1/K of its original length, thus maintaining the input torque, namely, the engine torque, unchanged. This is the self-controlled torque characteristic required for vehicle traveling. A hyperbolic spring is then required for spring 17 rather than a linear one. When compressed, the product of spring length and compressing force remains constant. Various methods may be used to manufacture this kind of spring, and do not need more explanation here. This is an example of a self-controlled torque mechanism using axial variable capacity pump.

Figure 2A:
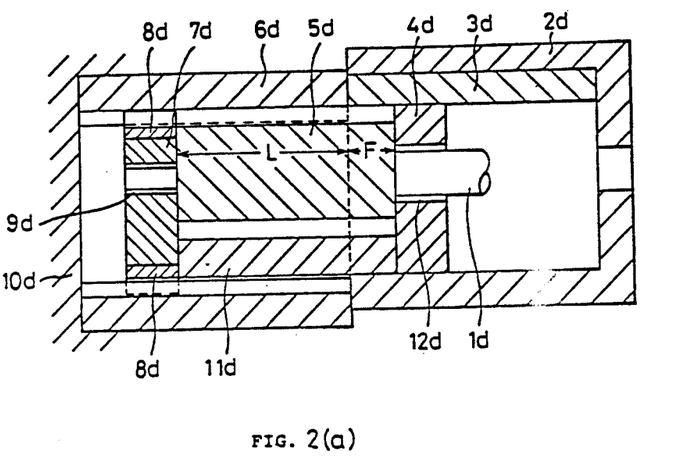
Figure 2B:
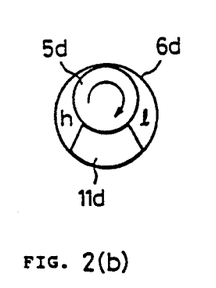
FIG. 2(b) is a sketch showing the cross-section within the interval L in FIG. 2 (a)
Figure 2C:
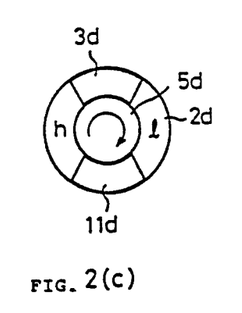

With the same principle as mentioned above, an embodiment of axial variable capacity internal gear pumps is shown in FIG. 2. The operating principle of internal ring gear pumps is well known. Referring to sketch 2 (b), gear 5d internally meshes with ring gear 6d. When the pump is rotating in the direction as shown in the figure under the sealing action of radial seal block 11d, the oil will be pumped from low pressure area 1 into high pressure area h. If, in FIG. 2 (a), radial seal block 11d and gear 5d move leftward with sliding end plates 4d and 7d, the meshing length of gear 5d and internal ring gear 6d, namely the working length L, will then be lengthened, or else shortened. Capacity sleeved into internal ring gear 6d, rotatable around left sliding end plate 7d, and movable together with 7d, thereby forming the axial sealing on left side. Gear 5d is supported on neeld bearing 9d at the left end and rotable in unrotatable end plate 7d. Sliding end plate 4d forms the axial sealing on the right side. The interval denoted by length F is the area of "idle running," the cross-section of which is shown in FIG. 2(c). In the fixed cylinder 2d, gear 5d rotates within two radial seal blocks 3d and 11d, pumping oil from area 1 into area h and pumping the same amount of oil from area h back to area 1. Therefore, no pumping effect exists within interval F. This ensures an effective variation of capacity when the working length L is changed. An input shaft 1d, needle bearings 5d, 9d and 12d and the casing 10d are provided.

Figure 3A:
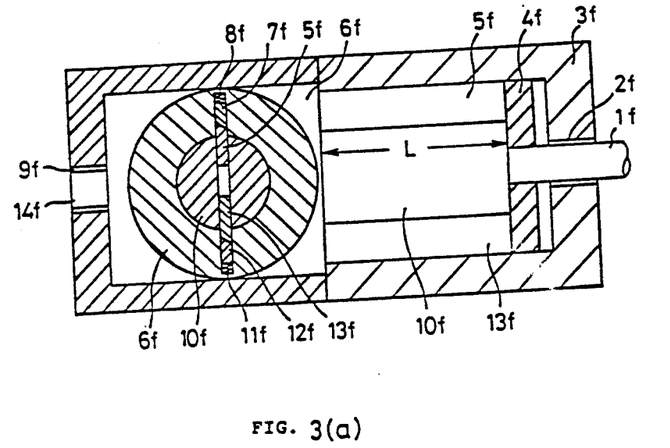
Figure 3B:
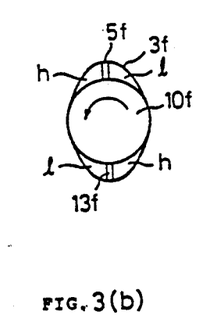

An axial variable capacity vane pump can also be formed according to the same principle aforementioned. An embodiment of axial variable capacity double action vane pumps in shown in FIG. 3. The operating principle of double action vane pumps is well known and can be briefly described using the sketch of FIG. 3 (b), which is a cross-sectional view within working length L. When rotor 10f rotates, vanes 5f and 13f radially move outward and inward into contact with the inner surface of stator 3f and pump oil from low pressure area 1 into high pressure area h. Only one set of vanes are shown in the figure. In order to make it easier to describe, capacity change member 6f located on left side is shown using a sectional view. It may be seen from the figure that capacity change member 6f may rotate with rotor 10f. Inside capacity change member 6f is a chamber for rotor 10f and vanes 5f and 13f to slide inward and outward as shown in FIG. 3 (a). Under slight pressure of small springs 8f and 11f, sealing blades 7f and 12f respectively contact with the edges of vanes 5f and 13f, thus improving the sealing among capacity change member, stator and vanes. Sliding end plate 4f is unrotatable and axially seals the right side in the chamber of stator 3f. When end plate 4f is pushed leftward, rotor 10f and vanes 5f and 13f are pushed into capacity change member 6f, thereby shortening length L and reducing delivery capacity per revolution. When end plate 4f moves rightward, the rotor and vanes also move right-ward to increases the delivery capacity. The right-ward motion may be realized by the pressure of an axial spring (not shown) in capacity change member 6f. This spring can also be used to compensate for axial clearance. This figure shows an input shaft driving rotor 1f, needle or ball bearings 10f, 2f and 9f and the shaft 14f of capacity change member 6f, which can be integrated with the input shaft.

An axial variable capacity single action vane pump may be formed with the similar structure as mentioned above. The only difference is that the capacity change member is coaxial with the rotor but eccentric to the stator since the rotor is eccentric. An axial variable capacity motor can be formed using the same principle and structure aforementioned.

The capacity change member in FIG. 3 is designed relatively larger with the consideration that it can be used as flywheel for the engine; otherwise it may be shortened as an end plate. The parts which form the axial sealing (e.g. sliding end plate, fixed end plate and capacity change member, etc.) may be termed as axial seal members, and those forming the radial sealing (e.g. radial seal blocks, stator, etc.) may be termed as radial seal members.

Figure 4:
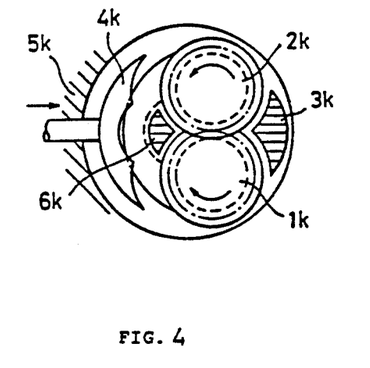
FIG. 4 is a cross-sectional view showing an effect-changeable external gear motor of the present invention.

An embodiment of effect-changeable gear motors is shown in FIG. 4. Meshing gears 1k and 2k are installed in casing 5k. The shadowed area denoted by 3k is the axial inlet of high pressure oil, and the area denoted by 6k is the axial outlet of the oil. Effect change member is denoted by 4k, the position of which shown in the figure is the "zero effect" position. At this position, the effect change member stands apart from the gears, oil running idly from 3k to 6k, unable to drive the gears, when effect change member 4k moves in the direction as shown by the arrow to approach the gears, motor effect gradually increases. When it is pushed to a position closely contacting the gears (this position is shown by dot dash lines), a "full effect" position is reached, the motor will then work with full effect and the high pressurized oil will drive gears to rotate in the direction as shown with its full potential. The axial seal plate (not shown) of the motor may function as an axial clearance compensator. Since the effect change member is radially movable, it may also be used as a radial clearance compensator. This is an advantage over ordinary gear motors.

When the effect change member is pushed from the zero effect position towards the full effect position, the motor effect gradually increases. This is favorable to starting a vehicle. When the distance between effect change member and gears increases, the input and output power, the output torque and output speed of the motor will decrease accordingly. The maximum distance — "zero effect" position will make gears and vehicle wheels run idle. This is equivalent to "out of gear". If the effect change member is pushed to "full effect" position and inlet 3k and/or outlet 6k are closed, the gears will then be unrotatable. This is equivalent to "brake".

Effect-changeable motor (or pump) has some advantages over fluid couplings: the efficiency does not decrease with the reduction of input speed; the load variation at the output end in the full effect position does not lead to speed variation caused by the motor; the vehicle may be started at any constant engine speed (if engine torque is sufficient); stepless regulation of output power, torque and speed may be realized with little variation of efficiency; the vehicle may be fully braked; power may be transmitted inversely; and the power shaft and working shaft do not have to be aligned with each other.

Figure 5:
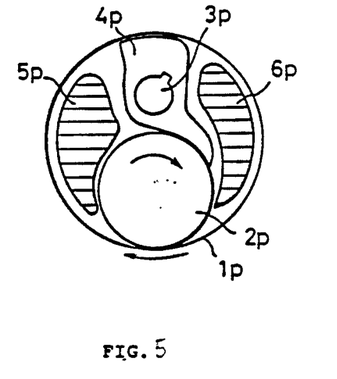
FIG. 5 is a cross-sectional view showing an effect-changeable internal gear motor of the present invention.

An embodiment of effect-changeable internal gear motors is shown in FIG. 5. The internal ring gear 1p and external gear 2p mesh with each other. The shadowed areas denoted by 5p and 6p are the inlet and outlet for the oil respectively. The rotating directions of gears 1p and 2p are shown by arrows. Effect change member is denoted by 4p, which is mounted on a rotatable axle 3p. The position of the effect change member shown in the figure is "full effect" position. When effect change member 4p driven by axle 3p rotates counter-clockwise, it will lose contact with the gear and the motor effect will gradually vanish. Clockwise rotation of effect change member 4p will increase the motor effect. At the full effect position, the clockwise torque around the center of axle 3p caused by the high pressure acting on the left upper part of effect change member 4p may be slightly greater than the counter-clockwise torque at the lower part so as to compensate the radial clearance. This can be done by properly designing the center position of axle 3p. The compensation of axial clearance is achieved by an axial floating end plate (not shown in the figure).

The aforementioned principle of changing effect applies to any kind of positive displacement pumps (or motors). For instance, if part of the cylinder wall is used as the effect change member for a plunger pump, an effect-changeable plunger pump is obtained.

The mechanism formed by using an effect-changeable pump of the present invention as a drive means of a hydraulic motor may be utilized to replace current fluid couplings. Its transmitting efficiency will be higher than that of fluid couplings at low speed, and may rotate and transmit power inversely.

Figure 6:
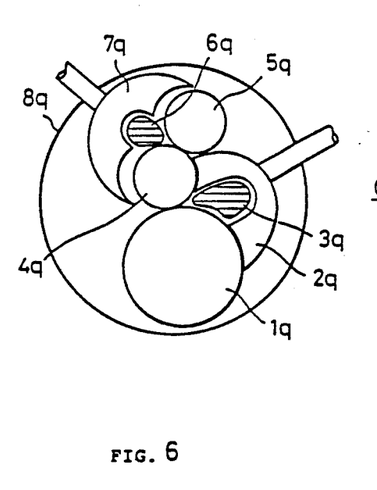
FIG. 6 is a sketch showing a reversing device of the present invention which utilizes the effect-changeable gear motor to make a vehicle move backward.

A reverse gear is needed in the gear box for a vehicle to travel reversely. This function also may be realized by the effect changeable motor. Referring to FIG. 6, three meshing gears 1q, 4q and 5q are mounted in case 8q (two pairs of gears may be used). The shadowed areas denoted by 3q and 6q are respectively the inlet and outlet for the oil. If the rotating direction of gear 1q is positive when effect change member 2q is at full effect position and effect change member 7q is at zero effect position, then gear 1q will rotate in negative direction when effect change member 2q is back to the zero effect position and effect change member 7q moves forward to its full effect position.

Figure 7:
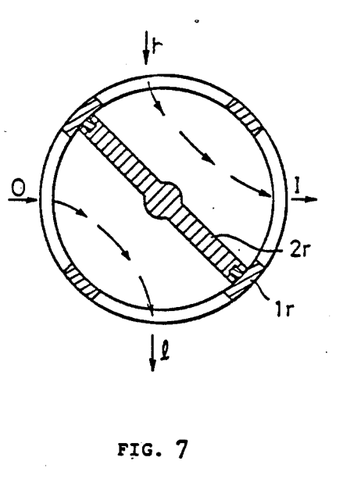
FIG. 7, is a sketch showing a directional valve which is utilize in an system having an effect-changeable motor to carry out the reverse gear operation.

The function of the reverse gear may also be achieved by reversing the oil flow, namely by exchanging the inlet and outlet of variable capacity pump so as to make the motor rotate reversely. To avoid additional resistance, the section area of directional valve should be as large as possible. An example is shown in FIG. 7. Throttle 2r may rotate in valve housing 1r. At the position shown in figure, oil flows into opening h and outside opening I, the returning oil then flows through openings o and 1. If the throttle 2r rotates by an angle of 45°, the flow direction will then be reversed, and the motor rotates in a reverse direction.

When hydrostatic transmission is employed in a vehicle, two effect-changeable motors for driving two driving wheels may be integrated with an axial variable capacity pump. These three can be assembled in a common casing with a common high pressure area and low pressure area in order to save some pipe and lessen pipe resistance. The transmitting shaft connecting to engine for driving the variable capacity pump and the output shaft of motor together form a "T" shape. The top dash of letter T represents the driving axle of the vehicle. In this case, two motors are connected in parallel, therefore they have the automatic differential function. When the vehicle makes a turn, the motor for the inner side wheel will rotate slower since the resistant torque is larger and the oil flowing into the motor is less, while the motor for outer side wheel will rotate faster since the resistant torque is smaller and the motor can get more oil. The "differential interlocking function" can easily obtained. If the wheel at one side is trapped in the mud and can only slip, the oil pipe leading to the motor on this side is then cut-off and the motor at the unslipping side will obtain sufficient torque. If the motor shown in FIG. 6 is employed, the effect change member for reverse rotation of the motor at the slipping side (e.g. effect change member 7q) may be pushed to its full effect position, so that very great resistant torque will be produced, functioning as a differential interlocking mechanism.

Figure 8:
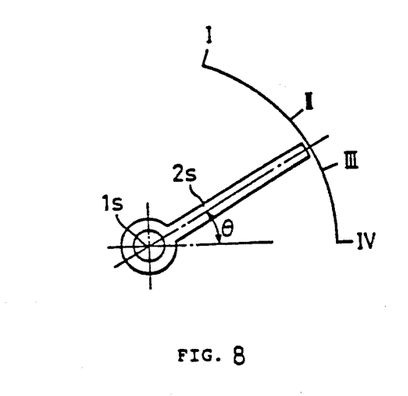
FIG. 8 is a sketch showing the operating pedal of the present invention used to control the operation of a vehicle by an effect-changeable motor.

If the aforementioned T-shaped hydrostatic transmitting system is utilized in a vehicle, the operating system of the vehicle may be rearranged as follows:

1. The clutch pedal, brake pedal, gear lever and hand brake lever are removed;

2. The throttle is replaced by an operating pedal which is shown in FIG. 8. The rotation of operating pedal 2s around pedal axle 1s drives some mechanism (not shown in the figure) to operate relevant devices. When the pedal is at the "slipping area" between positions II and III, the engine will be at idle speed, the effect-changeable motor is at zero effect position, and the vehicle will travel without power. If the pedal is stopped down into the "driving area" between positions III and Iv, the throttle will open wider with the decrease of angle $\theta$, and reach its widest position ($\theta = 0°$) at position IV. The effect-changeable motor is then at the "full effect" position. Within the "driving area", the hydrostatic transmitting system adjusts the working length L of axial variable capacity pump (or motor) according to the travelling resistance of the vehicle so as to allow the vehicle to have a full self-adaptability under different working conditions, such as starting, traveling, accelerating, climbing up a slope, etc. in the case of constant engine torque. When releasing the pedal, it will rotate back to increase angle $\theta$ under the force of a return spring (not shown in the figure). After the pedal moves into the "decelerating area" between positions II and I, the effect-changeable motor is at the "full effect" position and becomes a pump. The engine is at idling or extinction, the pedal mechanism pushing the sliding end plate of the axial variable capacity pump to make its working length L shorter than working length $L_E$ given by the aromatic torque converter. This means that the effect-changeable motor (now becoming a pump) will drive the variable capacity pump and engine to rotate at a higher speed. The resistant torque caused by pumping action of the engine and friction will decelerate the vehicle. The length difference $\Delta L = (L_E - L)$ increases with the increase of angle $\theta$. Larger $\Delta L$ gives larger resistance and larger deceleration. When the pedal is released back to position I, $\theta$ and $\Delta L$ will reach maximum and $L=0$, the inlet and outlet of the motor are totally cut-off and the vehicle is fully braked.

3. An independent hand-operating level (not shown) is utilized to manually adjust working length L of the axial veraible capacity pump. When starting, this lever is set at the position making L very small. Stepping down on the operating pedal and releasing the lever simultaneously will very smoothly start the vehicle under the control of automatic torque converter system. At normal operating condition, this lever itself sways forward and backward with the adjusting of automatic torque converter system. If this lever is manually pushed to position deviating from that given by the automatic torque converter system, the loading torque of the engine will vary accordingly. For instance, if L is greater than $L_E$, the loading torque of the engine will then increase. When the engine is started by pushing or pulling the vehicle, this lever may be pushed to the position of maximum L, then gradually reducing L after the vehicle starts moving. Starting the engine in this way will become much easier. This lever may be manually operated also for decelerating or braking the vehicle in case of emergency. Usually this lever is not ofter used.

Figure 9:
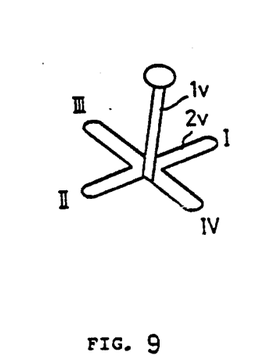
FIG. 9 is a sketch showing the auxiliary function control lever of the present invention used to control the operations of a vehicle by an effect-changeable motor.

4. An auxiliary function control lever as shown in FIG. 9 is set in the operating system. Auxiliary function control lever 1v may slide in cross-shaped guiding slot 2v. Position I is for front driving. At this position, the valve in the pipe for leading oil into effect-changeable motor of front wheels is open, and the effect change member of front wheel motor is simultaneously pushed to full effect position, front wheels functioning as driving wheels. Position II of the control lever is the position of reverse gear. The reverse gear mechanism as shown in FIG. 6 and 7 will move accordingly. Positions III and IV are respectively the left and right driving wheel locking positions, which are utilized to lock the slipping wheel in terms of the aforementioned method, so as to realize a differential interlocking function. The neutral position of this lever disables all performance and auxiliary functions at the aforementioned four positions.

When slowing down or braking the vehicle, to avoid too great a temperature rise caused by the conversion from vehicle kinetic energy into heat, the energy must. be led outside the system. The best way to solve the problem is to store this energy for future use. During deceleration and energy braking, the low pressure area in axial variable capacity torque converter becomes a high pressure area (since in this case, the wheels of vehicle drive effect-changeable motor to make it become a pump), which is connected to an accumulator through a check valve. The high pressure oil is then led to a well known type of accumulator. The stored energy may be utilized to start the engine. For instance, the high pressure oil may be led out to drive an axial variable capacity pump, thereby starting the engine. This energy may also be used as the power of direction turn booster and window wiper. If a truck with the dead weight of 4 tons and loading capacity of 2 tons travels at the speed of 36 km/h, it will possess a kinetic energy of 300,000 joules. Assuming 70% of this energy can be stored in the accumulator when the vehicle is braked to zero speed, the stored energy is sufficient to start the engine of JIEFANG CA-10B type truck for 8 times. If it is utilized to compress the air, it may compress air for 4.7 minutes for a one horse-power compressor. This time is enough for a vehicle travelling at 36 km/h to move a distance of 2.85 kms. This is suitable to buses and trucks in cities. This advantge comes form reversibility of hydraulic motors.

When $L=0$, the internal leakage of oil existing in the hydrostatic transmitting system allows the wheels to slightly rotate rather than to be "dead-locked" during emergency braking. Properly choosing the minimum value of L, the optimum rotation amount of wheels during emergency braking can be obtained. This method to prevent "deadlocked" wheels is simpler and more efficient than those employed in various current "deadlock-preventing" devices. If braking is needed when parking the vehicle, to prevent the braked wheels from rotating due to the oil leakage in clearances, an additional mechanical locking device is needed. Since both front and rear wheels are braked, the vehicle may be parked on steeper slopes.

Figure 10:
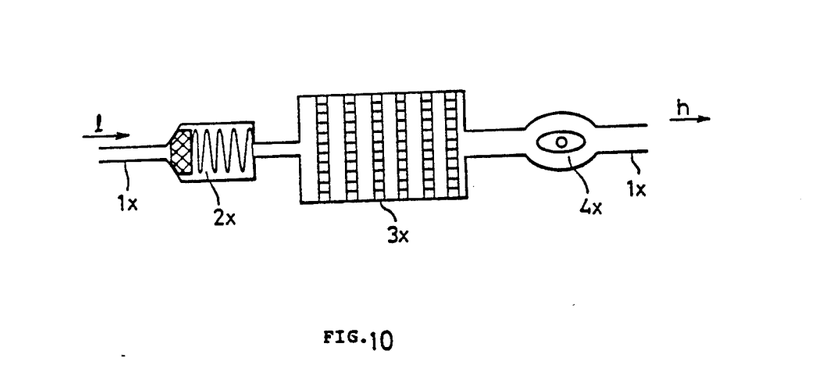
FIG. 10 is a sketch showing the connection of the oil filter in a hydrostatic transmitting system of the present invention.

Vane pumps, especially gear pumps, demand less cleanliness of oil. Filtration causes resistance and efficiency reduction. This has been a problem in hydrostatic transmitting systems. To obtain a better solution to the problem, a filter may be connected in the hydrostatic transmitting system between low pressure and high pressure areas as shown in FIG. 10. The 1 end of thin pipes 1x is connected to a low pressure area and the h end to a high pressure area. Check valve 2x opens only when the pressure in the low pressure area is higher than that in the high pressure area. The filter with high efficiency is denoted by 3x. Valve 4x is normally open (i.e. the position shown in the figure) and closed during emergency braking. Therefore, only when slowing down the vehicle can the oil be partly filtered, no resistance existing in the filter during normal operation. Therefore, the filter having greater resistance can be utilized without causing notable resistance in the system.

Compared with current variable capacity plunger pumps, the axial variable capacity rotary positive displacement pump presented in this invention has the advangtages of simpler structure, lower cost and better ability to withstand dirty oils.

Compared with a current vortex type hydraulic torque converter, the basic hydrostatic transmitting system (i.e. axial variable capacity torque converter) presented in this invention has advantages in the following aspects: Although their highest efficiencies are close to each other, the axial variable capacity torque converter may keep its high efficiency in an almost infinite range of speed ratios (L may approach zero), while a vortex type torque converter can keep its high efficiency only in a very narrow range of speed ratios. The average efficiency of the former is therefore higher than that of the latter in practical applications. Furthermore, the axial variable capacity torque converter can reversely transmit power, can torque in reverse direction (reverse gear), can allow input and output shafts to run idle, can stably operate at very low input speed, and can also be utilized as a brake etc.

The present invention has advantages over current hydro-mechanical transmission in all aspects of main performances:

1. The highest efficiency of vortex type torque converter is about 0.8–0.9 (equivalent to the efficiency of axial variable capacity pump of the present invention), and the highest efficiency of the mechanical portion in hydro-mechanical transmission is about 0.85–0.9 (equivalent to the efficiency of effect-changeable motor of the present invention), but the present invention can keep its high efficiency in a very wide range of speed ratios, its average efficiency is therefore higher than that of hydro-mechanical transmission in practical application.

2. The axial variable capacity torque converter may automatically change the transmitting torque in a very wide range of speed ratios, much wider than that of hydro-mechanical transmission.

3. Simple operation, low labor intensity and little probability of mistaken operation.

4. Excellent brake performance:

(1) There is no mechanical friction in the brake system. Therefore, it may properly work in harsh environments with high humidity, water, oil, combustible gas, etc. and is adaptable widely and reliable. Moreover, maintenance is much easier since "friction pair" is eliminated.

(2) Production cost is very low since very few brake parts are needed. The main brake structure utilizes a driving motor and so on, eliminating all mechanisms used in current brake systems.

(3) Easy to operate, no booster is needed. Hence brake performance is reliable.

(4) Brake time delay is very short because the responding time for the driver just to release the same pedal is shorter than that to step down another pedal and the responding time of the hydraulic pump is also very short because of the simplified load transmitting mechanism. Shortening the brake time is of great significance for high speed vehicles to shorten their stopping distance.

(5) The requirement of preventing "deadlocked" wheels during braking can be easily met, the optimum brake performance may be easily obtained by adjusting the minimum value of L.

(6) The present brake system may automatically balance the brake torques for left and right side wheels to prevent the vehicle from braking steer during brake. The two driving motors on two sides are connected in parallel. If one motor temporarily produces a larger brake torque because of improper adjustment or different road drags acting on two sides, this motor will then attempt to drive another motor of smaller brake torque to rotate in a reverse direction, thus increasing the latter's brake torque. Furthermore, the motor with smaller torque will have smaller pumping power (motors become pumps during brake period), hence have a tendency to decrease the oil pressure and reduce another motor's brake torque. The automatic balance of brake torques is therefore achieved.

(7) The kinetic energy of the vehicle during braking period can be stored in an accumulator for other uses.

(8) The front wheels can also be braked, the vehicle can be parked on a steep slope.

5. Front driving can be easily realized, the passibility of the vehicle can be improved.

6. Power can be transmitted reversely. Therefore, the engine may be started by pushing or pulling the vehicle, and may be used to decelerate the vehicle.

7. The vehicle may travel reversely at any speed. This is of importance for vehicles with internal combustion engines.

8. This system has differential interlocking function.

On the other hand, when compared with current mechanical transmitting systems, the hydrostatic transmitting system of the present invention also has advantages:

1. The clutch, gear box, reductor and differential or rear axle for the vehicle are all eliminated. Added to the vehicle is only an axial variable capacity torque converter which is composed of a pump and two motors assembled in a common casing (altogether, there are six gears and a few auxiliaries). Weight and volume of the system are considerably reduced, production costs are largely lowered.

2. Only engine torque is transmitted through transmitting shaft (i.e. drive shaft), the cross section of the shaft can be reduced.

3. Two effect-changeable motors and relevant pipes are added for front driving, but the cost is still lower than that in mechanical transmission for transfer case, transmitting shaft, and front driving axle with constant-velocity joint.

4. Engine flywheel is eliminated, the starting system is replaced by an accumulator, the battery may have smaller capacity.

5. The reserve power of engine may be reduced, thus lowering the production costs.

Regarding efficiency, the hydrostatic transmitting systems of the present invention has the following features when compared with current mechanical transmission:

1. The efficiency of mechanical transmission at different gears or speeds is usually lower than its highest efficiency, while the efficiency of the present invention is basically unchanged.

2. The engine employed in the present invention may have constant output torque which therefore can be fixed to a level with the lowest specific fuel consumption.

3. Based on the same reason as above, a diesel engine which has low specific fuel consumption but poor adaptability is adoptable.

4. The air pump in current brake systems for medium and large trucks can be eliminated.

5. The energy stored in accumulator during the braking period may be used to compress the inlet air for the engine so as to lower the specific fuel comsumption.

6. More trailers may be trailed (truck train) to obtain more economic transportation. This is equivalent to considerably increasing the transmitting efficiency.

7. The performance of automatic torque converting in the hydrostatic transmitting system of the present invention makes the vehicle possess fully self-adaptability and always travel with optimum economy. This is equivalent to increasing the average transmitting efficiency.

It can be seen therefrom that when judged from a view point of transportation economy, the hydrostatic transmitting system of the present invention is of high efficiency.

In addition to applying the present invention to vehicles, it may also be utilized for other engineering machines and other purposes.

I claim:
1. A rotary positive displacement comprising:
    a casing with an inlet and an outlet;
    at least one rotary member mounted in said casing and being able to rotate about an axis, said rotary member having a plurality of engaging means about the periphery thereof for engaging a mating member; and
    sealing means for selectively forming sealed working chambers between said rotary and mating members and for selectively changing the tightness of said working chambers thereby to change the pump effect of said pump.
2. A pump as claimed in claim 1, wherein said rotary and mating members are two gears meshing with each other.
3. A pump as claimed in claim 2, wherein said sealing means comprises two axial sealing members arranged at either axial side of said gears and a radial sealing member arranged between an inner surface of said casing and tooth tops of said gears, at least one of said sealing members being able to move between a first position at which said sealed working chambers with the highest tightness are formed and a second position at which said tightness of said working chambers is so low that said pump effect of said pump is lost completely.
4. A pump as claimed in claim 3, wherein said radial sealing member is movable between said first and second positions.
5. A pump as claimed in claim 4, wherein said radial sealing member consists of a sealing block which may be straight and gradually move from said first position to said second position or from said second position to said first position in a radial plane so as to gradually decrease or increase said pump effect of said pump respectively.
6. A pump as claimed in claim 1, wherein said rotary and mating members are a gear and a ring gear internally meshing with each other.
7. A pump as claimed in claim 6, wherein said sealing means comprises two axial sealing members arranged at either axial side of said gears and a radial sealing member arranged between said gear and said ring gear, at least one of said sealing members being able to move between a first position at which said sealed working chambers with the highest tightness are formed and a second position at which said tightness of said working chambers is so low that said pump effect of said pump is lost completely.
8. A pump as claimed in claim 7, wherein said radial sealing member is movable between said first and second positions.
9. A pump as claimed in claim 8, wherein said radial sealing member consists of a sealing block which may gradually rotate from said first position to said second position or from said second position to said first position in a radial plane so as to gradually decrease or increase said pump effect of said pump respectively.
10. A pump as claimed in claim 1, wherein said rotary and mating members are three gears in which an intermediate gear is meshing simultaneously with two side-arranged gears.
11. A pump as claimed in claim 10, wherein said sealing means comprises two radial sealing members of which one is arranged between an inner surface of said casing and tooth tops of said intermediate gear and one said side-arranged gear, another is arranged between said inner surface of said casing and tooth tops of said intermediate gear and another said side-arranged gear, each of said radial sealing members being able to move between a first position at which said sealed working chambers with the highest tightness are formed and a second position at which said tightness of said working chambers is so low that said pump effect of said pump is lost completely.
12. A pump as claimed in claim 1, further comprising:
    an associated transmitting shaft rotatably connected to said rotary member; and
    control means for controlling rotation of said rotary associated transmitting shaft starts rotation, accelerate, rotates idly, changes a direction of the rotation, decelerates and brakes.
13. A hydrostatic transmitting system, comprising at least one pump and at least one motor driven by said pump, said pump being a rotary displacement pump which comprises:
    a casing with an inlet and an outlet;
    at least one rotary member mounted in said casing and being able to rotate about an axis, said rotary member having a plurality of engaging means about the periphery thereof for engaging a mating member; and
    sealing means for selectively forming sealed working chambers between said rotary and mating members and for selectively changing the tightness of said working chambers thereby to change the pump effect of said pump.

* * * * *